US011411807B2

(12) United States Patent
Kozhaya et al.

(10) Patent No.: US 11,411,807 B2
(45) Date of Patent: Aug. 9, 2022

(54) METHOD AND SYSTEM FOR DETECTING AND MITIGATING CABLING ISSUES WITH DEVICES IN SUBSTATION AUTOMATION SYSTEMS

(71) Applicant: ABB Schweiz AG, Baden (CH)

(72) Inventors: David Kozhaya, Dietikon (CH); Thanikesavan Sivanthi, Birmenstorf AG (CH); Yvonne-Anne Pignolet, Zürich (CH)

(73) Assignees: ABB Schweiz AG, Baden (CH); Hitachi Energy Switzerland AG, Baden (CH)

( * ) Notice: Subject to any disclaimer, the term of this patent is extended or adjusted under 35 U.S.C. 154(b) by 174 days.

(21) Appl. No.: 16/772,771

(22) PCT Filed: Jun. 17, 2019

(86) PCT No.: PCT/IB2019/055014
§ 371 (c)(1),
(2) Date: Jun. 13, 2020

(87) PCT Pub. No.: WO2020/254852
PCT Pub. Date: Dec. 24, 2020

(65) Prior Publication Data
US 2022/0131741 A1 Apr. 28, 2022

(51) Int. Cl.
*H04L 41/0659* (2022.01)
*H04L 41/0677* (2022.01)

(52) U.S. Cl.
CPC ...... *H04L 41/0659* (2013.01); *H04L 41/0677* (2013.01)

(58) Field of Classification Search
None
See application file for complete search history.

(56) References Cited

U.S. PATENT DOCUMENTS

| | | | |
|---|---|---|---|
| 6,182,135 B1 * | 1/2001 | Ruane | H04L 45/26 709/224 |
| 6,473,403 B1 * | 10/2002 | Bare | H04L 45/26 370/236 |

(Continued)

OTHER PUBLICATIONS

EPO, International Search Report and Written Opinion for PCT/IB2019/055014, dated Feb. 14, 2020, 14 pages.

*Primary Examiner* — Ranodhi Serrao
(74) *Attorney, Agent, or Firm* — Leydig, Voit & Mayer, Ltd.

(57) ABSTRACT

The invention relates to a method and system for detecting and mitigating cabling issues with devices connected in industrial redundant networks. An agent runs on each device and generates information about traffic received at the corresponding device. The agent running on a node generates indicators of traffic received at each port, and error rates for traffic at each port. The agent running on a switch generates information about switch misconfiguration by collecting device identifiers for each port of the switch. The agents send the information to a network manager, which determines switch misconfigurations and wrong cabling from the received information. The network manager also mitigates cabling issues by sending a signal to the affected device(s) or sending a communication to mitigate the issue.

7 Claims, 6 Drawing Sheets

(56) References Cited

U.S. PATENT DOCUMENTS

| | | | |
|---|---|---|---|
| 7,283,476 B2* | 10/2007 | Bare | H04L 67/1002 370/254 |
| 8,344,736 B2* | 1/2013 | Wimmer | H04L 41/06 324/555 |
| 8,380,828 B1 | 2/2013 | Schlichter et al. | |
| 9,148,465 B2* | 9/2015 | Gambardella | G06F 9/541 |
| 9,507,566 B2* | 11/2016 | Payne | G06F 7/58 |
| 9,507,579 B2* | 11/2016 | Gambardella | G06F 9/54 |
| 2003/0142685 A1* | 7/2003 | Bare | H04L 67/1002 370/410 |
| 2010/0110904 A1* | 5/2010 | Wimmer | H04L 1/22 370/248 |
| 2012/0187961 A1 | 7/2012 | Hashim et al. | |
| 2014/0298091 A1* | 10/2014 | Carlen | H04L 65/80 714/15 |
| 2014/0304695 A1* | 10/2014 | Gambardella | H04L 67/34 717/168 |
| 2014/0304718 A1* | 10/2014 | Gambardella | G06F 9/541 719/328 |
| 2017/0052830 A1* | 2/2017 | Gambardella | G06F 8/65 |

* cited by examiner

| Case | Device 1 | | Device 2 | | Device 1 | | Device 2 | | Device 1 | | Situation |
|---|---|---|---|---|---|---|---|---|---|---|---|
| | Wrong A | Wrong B | Wrong A | Wrong B | errA | errB | errA | errB | stValA | stValB | |
| 1 | 0 | 0 | 0 | 0 | 0 | 0 | 0 | 0 | 1 | 1 | 0 |
| 2 | 0 | 0 | 0 | 1 | 50 | 0 | 0 | 100 | 1 | 0 | 1 |
| 3 | 0 | 0 | 1 | 0 | 0 | 50 | 100 | 0 | 0 | 1 | 2 |
| 4 | 0 | 0 | 1 | 1 | 100 | 100 | 100 | 100 | 1 | 1 | 3 |
| 5 | 0 | 1 | 0 | 0 | 0 | 100 | 0 | 50 | 1 | 1 | 4 |
| 6 | 0 | 1 | 0 | 1 | 50 | 50 | 50 | 50 | 1 | 1 | 5 |
| 7 | 0 | 1 | 1 | 0 | 0 | 0 | 0 | 0 | 0 | 0 | 6 |
| 8 | 0 | 1 | 1 | 1 | 100 | 0 | 0 | 100 | 1 | 1 | 7 |
| 9 | 1 | 0 | 0 | 0 | 100 | 0 | 0 | 50 | 1 | 1 | 8 |
| 10 | 1 | 0 | 0 | 1 | 0 | 0 | 0 | 0 | 0 | 0 | 6 |
| 11 | 1 | 0 | 1 | 0 | 50 | 50 | 50 | 50 | 1 | 1 | 5 |
| 12 | 1 | 0 | 1 | 1 | 0 | 100 | 100 | 0 | 1 | 1 | 9 |
| 13 | 1 | 1 | 0 | 0 | 100 | 100 | 100 | 100 | 1 | 1 | 3 |
| 14 | 1 | 1 | 0 | 1 | 0 | 50 | 100 | 0 | 0 | 1 | 2 |
| 15 | 1 | 1 | 1 | 0 | 50 | 0 | 0 | 100 | 1 | 0 | 1 |
| 16 | 1 | 1 | 1 | 1 | 0 | 0 | 0 | 0 | 1 | 1 | 0 |

| Case | Device 1 | | Device 2 | | Device 1 | | Device 2 | | Device 1 | | Situation |
|---|---|---|---|---|---|---|---|---|---|---|---|
| | Wrong A | Wrong B | Wrong A | Wrong B | errA | errB | errA | errB | stValA | stValB | |
| 1 | 0 | 0 | 0 | 0 | 0 | 0 | 0 | 0 | 1 | 1 | 0 |

FIG. 7A

| Case | Device 1 | | Device 2 | | Device 1 | | Device 2 | | Device 1 | | Situation |
|---|---|---|---|---|---|---|---|---|---|---|---|
| | Wrong A | Wrong B | Wrong A | Wrong B | errA | errB | errA | errB | stValA | stValB | |
| 16 | 1 | 1 | 1 | 1 | 0 | 0 | 0 | 0 | 1 | 1 | 0 |

FIG. 7B

| Case | Device 1 | | Device 2 | | Device 1 | | Device 2 | | Device 1 | | Situation |
|---|---|---|---|---|---|---|---|---|---|---|---|
| | Wrong A | Wrong B | Wrong A | Wrong B | errA | errB | errA | errB | stValA | stValB | |
| 5 | 0 | 1 | 0 | 0 | 0 | 100 | 0 | 50 | 1 | 1 | 4 |

FIG. 7C

| Case | Device 1 | | Device 2 | | Device 1 | | Device 2 | | Device 1 | | Situation |
|---|---|---|---|---|---|---|---|---|---|---|---|
| | Wrong A | Wrong B | Wrong A | Wrong B | errA | errB | errA | errB | stValA | stValB | |
| 8 | 0 | 1 | 1 | 1 | 100 | 0 | 0 | 100 | 1 | 1 | 7 |
| 9 | 1 | 0 | 0 | 0 | 100 | 0 | 0 | 50 | 1 | 1 | 8 |

FIG. 7D

| Case | Device 1 | | Device 2 | | Device 1 | | Device 2 | | Device 1 | | Situation |
|---|---|---|---|---|---|---|---|---|---|---|---|
| | Wrong A | Wrong B | Wrong A | Wrong B | errA | errB | errA | errB | stValA | stValB | |
| 12 | 1 | 0 | 1 | 1 | 0 | 100 | 100 | 0 | 1 | 1 | 9 |

FIG. 7E

| Case | Device 1 | | Device 2 | | Device 1 | | Device 2 | | Device 1 | | Situation |
|---|---|---|---|---|---|---|---|---|---|---|---|
| | Wrong A | Wrong B | Wrong A | Wrong B | errA | errB | errA | errB | stValA | stValB | |
| 6 | 0 | 1 | 0 | 1 | 50 | 50 | 50 | 50 | 1 | 1 | 5 |
| 11 | 1 | 0 | 1 | 0 | 50 | 50 | 50 | 50 | 1 | 1 | 5 |

FIG. 7F

| Case | Device 1 | | Device 2 | | Device 1 | | Device 2 | | Device 1 | | Situation |
|---|---|---|---|---|---|---|---|---|---|---|---|
| | Wrong A | Wrong B | Wrong A | Wrong B | errA | errB | errA | errB | stValA | stValB | |
| 7 | 0 | 1 | 1 | 0 | 0 | 0 | 0 | 0 | 0 | 0 | 6 |
| 10 | 1 | 0 | 0 | 1 | 0 | 0 | 0 | 0 | 0 | 0 | 6 |

FIG. 7G

| Case | Device 1 | | Device 2 | | Device 1 | | Device 2 | | Device 1 | | Situation |
|---|---|---|---|---|---|---|---|---|---|---|---|
| | Wrong A | Wrong B | Wrong A | Wrong B | errA | errB | errA | errB | stValA | stValB | |
| 4 | 0 | 0 | 1 | 1 | 100 | 100 | 100 | 100 | 1 | 1 | 3 |
| 13 | 1 | 1 | 0 | 0 | 100 | 100 | 100 | 100 | 1 | 1 | 3 |

FIG. 7H

METHOD AND SYSTEM FOR DETECTING AND MITIGATING CABLING ISSUES WITH DEVICES IN SUBSTATION AUTOMATION SYSTEMS

FIELD OF THE INVENTION

The present invention generally relates to redundant communication networks in substation automation systems. More specifically, the present invention relates to detecting and mitigating cabling issues with devices connected in such redundant communication networks.

BACKGROUND OF THE INVENTION

Industrial systems often include communication networks that provide high availability, necessary for monitoring and controlling certain critical industrial processes. Absence of such high availability can lead to downtime or shutdown of the controlled industrial processes.

To ensure high availability, industrial control systems such as substation automation systems often rely on seamless redundancy protocols. These include Parallel Redundancy Protocol (PRP) and High-availability Seamless Redundancy (HSR) as described under IEC 62439. The high availability achieved by these protocols relies on the correct cabling of the network devices (i.e. nodes and/or switches).

In PRP, cabling issues can exist at ports of nodes or that of switches. For example, ports can be connected to the wrong local area network, or there may be missing cables at certain ports (e.g. missed during commissioning or cable failure after installation), In HSR, cabling issues can exist at ports of nodes. For example, there may be missing cables at certain ports.

Existing methods have investigated ways to prevent having wrong cabling in the first place or to detect its existence in the network.

One approach aims at visibly identifying wrong cabling through inspections. The approach relies on using color codes for cables and plugs, which requires some engineering effort, or might be even impossible to achieve when using off-the-shelf components.

Another approach described in US 20100110904 aims at detecting wrong cabling in the network. This method detects cases where ports of a network device are wrongly connected to redundant communication networks. This method only allows the detection of wrong cabling on the level of doubly connected nodes/devices (end devices) and it also detects missing cables.

As such the existing methods rely on manual inspections; or are limited to certain types of network devices. These methods may not work feasibly for redundant communication networks supporting PRP and/or HSR, especially in accurately identifying which ports or which devices (nodes or switches) are misconfigured. Additionally, these methods fail to take preventive measures in the presence of such misconfigurations.

There is accordingly need for a method and system that accurately identifies such misconfigurations in redundant communication networks and assists in mitigating the effect of such misconfigurations.

SUMMARY OF THE INVENTION

The invention discloses a method and system for detecting and mitigating cabling issues with devices connected in redundant communication networks of a substation automation system. In some embodiments, the redundant communication networks support one or more of Parallel Redundancy Protocol (PRP) and High-availability Seamless Redundancy (HSR).

Each device connected to the redundant communication networks can be a node or a switch, it is to be noted that there can be several types of devices or equipment in substation automation system, which would be readily apparent to those skilled in the art. The invention identifies cabling issues with communication devices (nodes or switches) connected in the redundant communication networks. A node may be a wired communication device, and in case of the redundant networks the node typically is a doubly attached node (DAN). In other words, the node is connected to two separate networks and the same information is communicated in the two separate networks (e.g. LAN A and LAN B) through separate ports (e.g. port A and port B). A switch can be an ethernet switch or network switch that provides physical connectivity to a network.

The method can be implemented in a distributed manner, wherein some information is generated by each device that is connected to the redundant communication networks. This information is communicated to a supervisory device (e.g. central/distributed) which determines cabling issues. Accordingly, the method comprises receiving, at periodic instants of time, from each device information associated with traffic received at the corresponding device.

At each device, such as at a node or a switch, frames are monitored to determine certain information.

For a node, total number of frames received at each port (CntReceivedA, CntReceivedB) and total number of frames received with wrong network identifiers at each port (CntWrongLanA, CntWrongLanB) is monitored. This is used to generate an indicator of traffic received for each port (StValA, StValB), and an error rate for the traffic received at each port (ErrA, ErrB).

The indicator of traffic for each port (StValA, StValB) can be calculated using the total number of frames received at each port (CntReceivedA, CntReceivedB). For example:

StValA=0, if CntReceivedA=0; otherwise StValA=1.

The error rate for the traffic received at each port can be calculated from the total number of frames received at each port (CntReceivedA, CntReceivedB) and total number of frames received with wrong network identifiers at each port (CntWrongLanA, CntWrongLanB). For example:

ErrA=CntWrongLanA/CntReceivedA*100; if CntReceivedA is not 0;

otherwise ErrA=0

For a switch, one or more device identifiers (e.g. MAC addresses) collected for each port is monitored. For example, Layer 2 discovery protocols such as Link Layer Discovery Protocol (LLDP) can be utilized at a switch. The LLDP information comprises unique identifiers (MAC address) of one or more devices connected to the ports of a switch. Such information can be compared with network information already available with the switch (e.g. in a network configuration file) to determine if there are any devices the switch is connected to, which it should not be. In other words, if there are any neighboring devices that the switch is communicating with to whom it should not be communicating.

Thus, the device identifiers collected for each port of the switch can be used to generate at least one of a status information and a misconfiguration information. For example, when all neighboring devices are connected as desired, a message indicating healthy status can be communicated. Taking another example, if some wrong neighbors are detected (e.g. switch connected to another switch of the redundant network), then such information can be communicated.

Thus, each device (node or switch) periodically generates information based on the traffic at the corresponding device.

In accordance with the method, the information received from a node comprises the indicator of traffic received for each port (StValA, StValB), and the error rate for the traffic received each port (ErrA, ErrB). As mentioned, the indicators and the error rates are determined from total number of frames received at each port (CntReceivedA, CntReceivedB) and total number of frames received with wrong network identifiers at each port (CntWrongLanA, CntWrongLanB). Further, the information received from a switch comprises at least one of the status information and the misconfiguration information. As mentioned, the status information and the misconfiguration information are determined from one or more device identifiers collected for each port of the switch.

The method further comprises determining an issue with one or more cable connections at one or more devices, based on the information received from each device. Information received from each device (node/switch) is utilized to check if there are any switch misconfigurations or if there are any wrong cablings. A switch misconfiguration is determined if the information received from at least one switch includes the misconfiguration information.

A wrong cabling is determined for one or more ports (WrongA, WrongB) of one or more nodes based on the information received from each node. For example, the StValA, StValB, ErrA and ErrB for a device can be compared with reference values to see if the ports of the device are connected to the correct network, if they are receiving traffic of another network, if there are high number of frames with wrong network identifiers etc. The reference values are available (e.g. stored as a table or in memory of the device, which can be configured during engineering) for the indicators and error rates. As an example, ErrA can be one of '0', '50', '100', and StValA can be one of '0' and 1', and this can be defined beforehand. Therefore, WrongA, WrongB for port A and port B can be determined from ErrA, ErrB and StValA, StValB. For example, at a node:

WrongA=0, WrongB=1; if ErrA=0, ErrB=100; StValA=1, and StValB=1.

The comparison with the reference values identifies whether a node or which pair of nodes are facing a problem, if so which port or ports of the effected devices are facing the problem and so forth. For example, one port of one node in a paired set of nodes in the network can have wrong cabling; two ports of one node in the paired set of nodes can have wrong cabling, one port of both the nodes in the paired set of nodes can have wrong cabling, or both the ports of both the nodes can have wrong cabling.

Once the identity of the device having the issue with the cable connections is determined, mitigation can be performed. Accordingly, the method includes mitigating the issue determined with the one or more cable connections at the one or more devices. The switch misconfiguration determined for at least one switch is mitigated by sending a signal to shut down the corresponding ports of the at least one switch that are detected as misconfigured. The wrong cabling determined for the one or more ports of the one or more nodes is mitigated by one of two options. In one option, where possible, a signal is sent to the node to shut down the ports of the node that are detected as misconfigured. In another option, a communication with a sequence of steps to be performed for mitigating the wrong cabling is sent (e.g. to a device with industry personnel so that the personnel can resolve the issue by following the communication).

In an embodiment, switch misconfigurations are detected and mitigated prior to detecting and mitigating wrong cabling at nodes. In accordance with this embodiment, determining the issue with the one or more cable connections includes sequentially performing:

determining the switch misconfiguration for the at least one switch;
mitigating the switch misconfiguration for the at least one switch;
determining the wrong cabling for the one or more ports of the one or more nodes; and
mitigating the wrong cabling for the one or more ports of the one or more nodes.

Thus, the method includes periodically receiving information from different devices connected to the redundant communication networks. The information is analyzed to determine if any switch or node is having misconfiguration, and depending on the misconfiguration, corresponding mitigation actions (e.g. shutting down affected ports) can be performed by communicating the mitigation actions to the corresponding devices.

The method can be performed with an industrial device such as with a Distributed Control System, or with a control device (controller or IED), which are connected (e.g. physically) to other devices in the redundant networks. The industrial device may also be one of the nodes of the redundant networks, which is connected to the other nodes and the switches to receive the information from them.

To enable the detection and mitigation of the cabling issues, the system of the present invention is disclosed. As mentioned, the method requires information from the devices (e.g. nodes, switches etc.), analysis of the information to determine the cabling issues and communication to mitigate the cabling issues.

Accordingly, the system for detecting and mitigating the cabling issues has an agent running on each device. These agents are configured to periodically generate and transmit the information associated with traffic at the corresponding device.

The agent on a node is configured to generate information of the indicator of traffic received for each port (StValA, StValB), and the error rate for the traffic received at each port (ErrA, ErrB).

The agent on a switch is configured to generate information of at least one of the status information and the misconfiguration information, from monitoring of one or more device identifiers collected for each port of the switch.

The system also has a network manager running on an industrial device. For example, the network manager may be provided on a DCS server, a control device (controller or IED) or on a node.

The industrial device is configured to receive the information transmitted by each agent. The industrial device is also configured to determine an issue with one or more cable connections at one or more devices based on the information received from each device. The industrial device is also configured to mitigate the issue determined with the one or more cable connections at the one or more devices.

The agents and the network manager can be provided as containers on the corresponding devices. In an embodiment, the agent on a node is a containerized module that implements the necessary logic for generating the statistics of indicators and error rates from the network stack. In accordance with the embodiment, the agent on a switch is a containerized module that implements the necessary logic for generating at least one of the status information and the misconfiguration information (e.g. based on the LLDP table entries of the switch). The agents can communicate their information to the network manager for example using HTTP. In accordance with the embodiment, the network manager can communicate with the agents on mitigating actions for example using SNMP.

BRIEF DESCRIPTION OF DRAWINGS

The subject matter of the invention will be explained in more detail in the following text with reference to exemplary embodiments which are illustrated in attached drawings in which:

FIGS. 7A 7H show different situations covered in the table of FIG. 6; and

DETAILED DESCRIPTION

Wrong cabling in redundant communication networks can limit the availability of the industrial automation systems built on top and sometimes even hinder their performance. For example, wrong cabling on one of the redundant networks may now cause some device to be non-reachable, due to the existing wrong cabling. Another example of the implications of wrong cabling is network congestion, especially when wrong cabling causes traffic specific intercross, i.e., every LAN sending twice as much traffic as it should in the normal case.

The invention makes use of existing processing capacity on devices in industrial automation systems to provide a distributed solution that can infer the status of physical connections in industrial redundant networks like PRP and HSR. The invention detects wrong cabling in such networks, and more precisely identifies where and how the network devices (nodes or switches) are wrongly cabled. Besides identifying wrong cabling, this invention automatically takes corrective (mitigating) actions, e.g., disabling ports on certain devices to mitigate hazardous effects of wrong cabling such as traffic intercross.

The invention relies on information from distributed agents deployed on network devices, firstly to collect data for identifying wrong cabling and secondly to apply automatic mitigation for the discovered misconfigurations.

Figure 1:
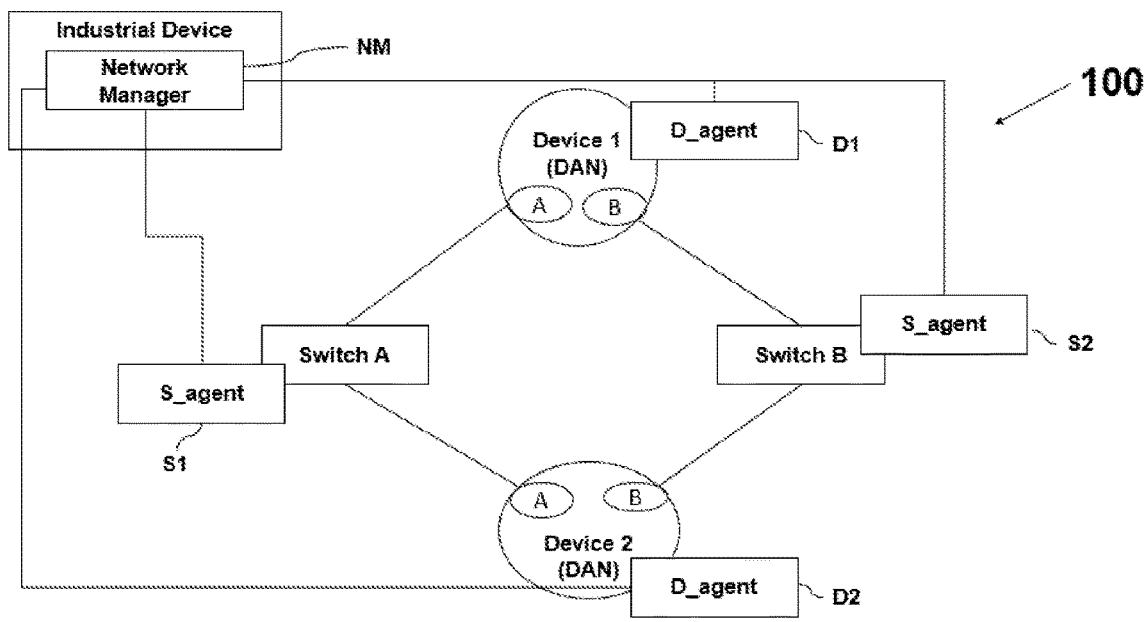
FIG. 1 is a simplified representation of a system for detecting and mitigating cabling issues with devices connected in redundant communication networks, in accordance with an embodiment of the invention.

Referring to FIG. 1, which illustrates a simplified representation of system (100) for detecting and mitigating cabling issues, in accordance with an embodiment of the invention.

The embodiment shown in FIG. 1, shows devices that are doubly attached nodes (DANs also referred as DANP for PRP) and switches (e.g. ethernet switches), which is the case of PRP, As shown in FIG. 1, a device (DAN) such as Device 1 is a wired communication device, which is physically connected to send redundant communication over separate networks to a paired device (Device 2). In other words, Device 1 sends the same communication via network A (switch A) and network B (switch B) to Device 2. Thus; the Device 1 can be seen a source node and the Device 2 a destination node. A switch (Switch A or Switch B) can be an ethernet switch or network switch that provides physical connectivity to a network.

Figure 2:
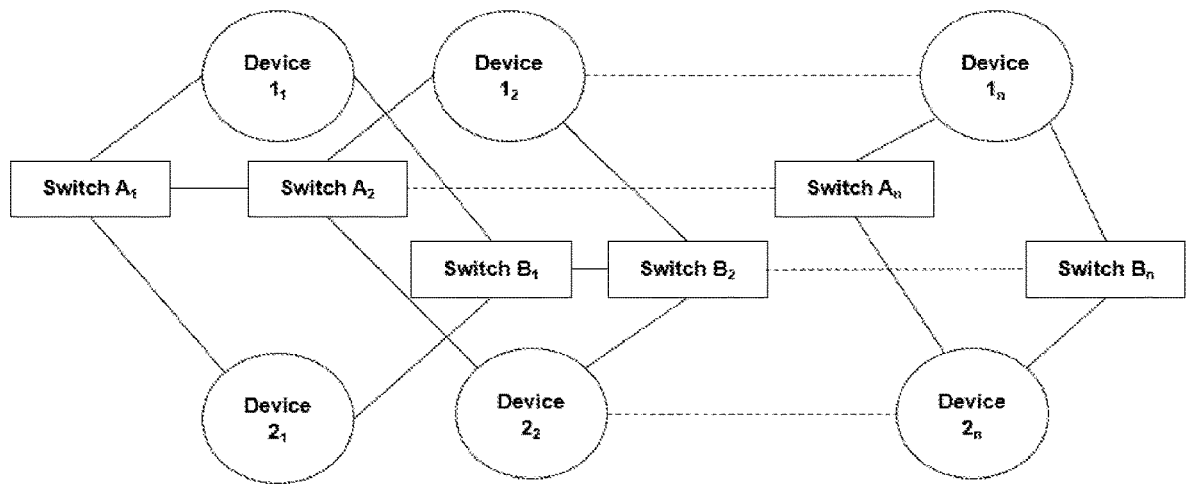
FIG. 2 is a simplified representation of devices connected in a network according to Parallel Redundancy Protocol (PRP)

It is to be noted that there can be several pairs of connected devices e.g. $D1_1$, $D2_1$; $D1_2$, $D2_2$, ... $D1_n$, $D2_n$) connected by several switches (Switches $A_1$, $A_2$, ... $A_n$; $B_1$, $B_2$ ... $B_n$) as shown in FIG. 2, and such configurations and variations thereof are expected to be apparent to those of ordinary skill of art.

Figure 3A:
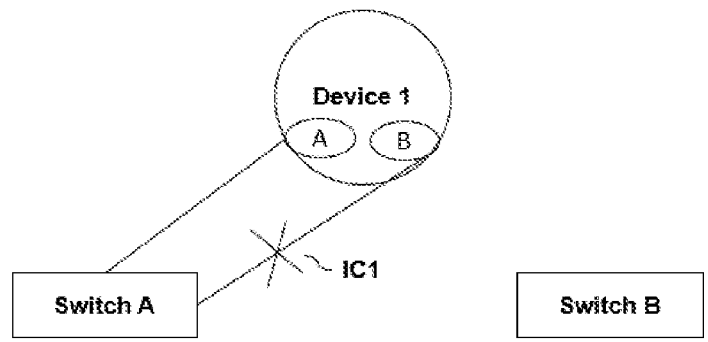
FIGS. 3a and 3b show examples of cabling issues with devices connected in PRP networks.
Figure 3B:
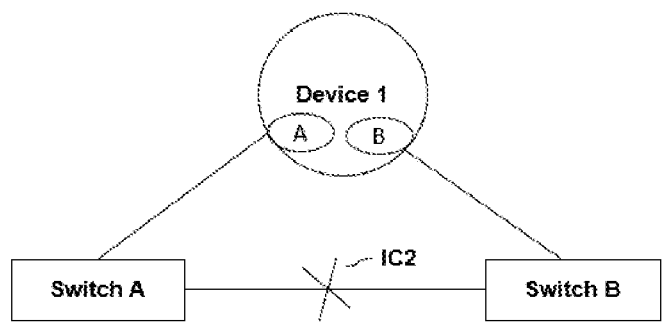

In case of PRP, there can be issues with cable connections at nodes or switches. An example of a cabling issue (IC1) is shown in FIG. 3a; where both the ports (A and B) of a node (Device 1) are attached to the same switch (Switch A). Taking another example (IC2), as shown in FIG. 3b, Switch A is connected to Switch B, where it clearly should not be. This can happen during commissioning or maintenance phase when wrong connections are introduced by the personnel.

Figure 4:
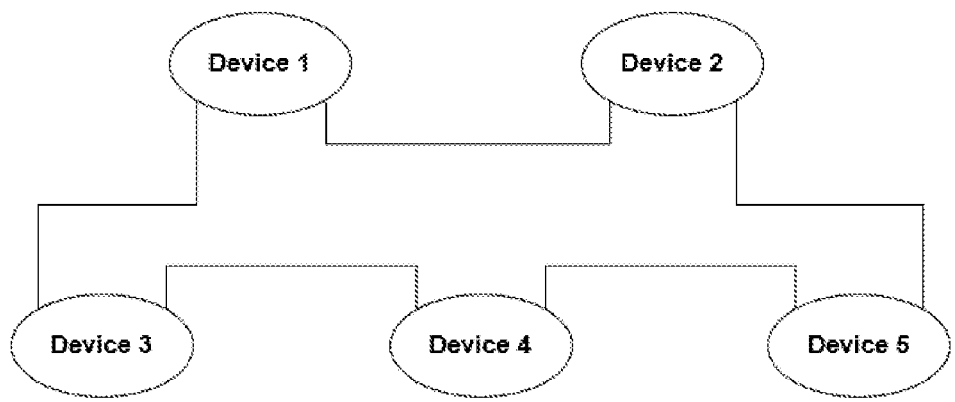
FIG. 4 is a simplified representation of devices connected in a network according to High-availability Seamless Redundancy (HSR)

In HSR, doubly attached nodes (DANs also referred as DANH for HSR) are typically connected to each other in such a way that they form a communication ring and no regular switches are intended, as shown in FIG. 4. Here, both the ports (not shown in FIG. 4) of a DANH send the same communication in different directions of the communication ring. Thus, the DANH sending the communication acts as the source node, while the DANH intended as recipient is the destination node.

Figures 5, 6:
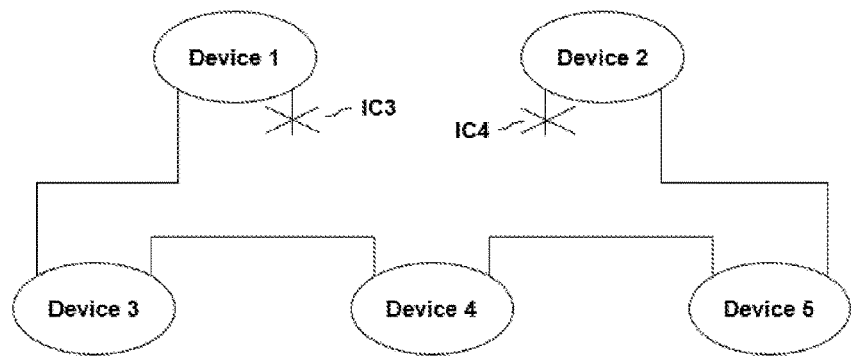
FIG. 5 show cabling issues with devices connected in HSR networks.
FIG. 6 is a table that shows various situations of a pair of devices in a PRP network, in accordance with an embodiment of the invention.

A cabling issue such as IC3 and IC4 can occur in the network shown in FIG. 4. The wrong cabling in HSR occurs when at least one port of one device is not connected to anything as shown in FIG. 5 by IC3 or IC4. This can happen during commissioning or maintenance phase when such connections are accidentally not established. It is to be noted that inverting cables on any single device (e.g., connecting swapping the connection at Device 1) does not affect traffic dissemination. Hence it is not seen as network error.

In accordance with the invention, to determine such cabling issues, the system includes agents running on all devices that are part of the redundant networks and a network manager that is connected (e.g. physically) to these agents.

The agents and the network manager can be provided as containers on the corresponding devices. In an embodiment, the agent on a node is a containerized module that implements the necessary logic for generating statistics of indicators and error rates from the network stack as described hereinafter. In accordance with the embodiment, the agent on a switch is a containerized module that implements the necessary logic for generating at least one of status information and misconfiguration information as described hereinafter. The agents can communicate their information to the network manager for example using HTTP. In accordance with the embodiment, the network manager is a containerized module(s) that implements the necessary logic for determining cabling issues and to communicate with the agents on mitigating actions for example using SNMP (as described hereinafter).

Agents running on a DAN are called D_agents (shown by D1, D2 in FIG. 1), while those running on switches are called S_agents (shown by S1, S2 in FIG. 1). As shown, both agents report to the network manager (shown by NM). Since no switches are needed in an HSR setting, there are only D_agents deployed on DANs in such cases.

The network manager could be either distributed or centralized and has physical connectivity to various devices on the network.

In FIG. 1, the network manager is provided in a centralized manner on an industrial device, for example as a DCS server connected with the nodes and switches, or as a control device (controller or IED). The control device may also be a node connected to other devices in the redundant communication networks. In case of a distributed implementation, the network manager functionality may be split across different industrial devices, where each industrial device monitors part of the network (e.g. some nodes/switches).

As mentioned, the network manager is configured to receive information from all devices and all switches in the network.

Both in PRP and HSR, network devices (DANs) are expected to multicast supervision frames on a periodical basis (e.g. every 2 seconds), DANs supporting PRP and HSR gather statistics on the traffic received over each port, e.g., total number of received frames (CntReceivedA, CntReceivedB), number of received frames with wrong network tag (identifier) (CntWrongLanA, CntWrongLanB) etc., amongst others.

Given these statistics, a D_agent (e.g. D1, D2) constructs a status table (as shown below in Table 1), for every DANP MAC address in the network. Here DANP represents a PRP node. The table is filled with values relative to frames exchanged within a time-window of a duration typically a multiple of the period at which supervision frames are sent. Such table is updated over time.

TABLE 1

Status Table Attributes

| MacAddress | Cnt-ReceivedA | Cnt-ReceivedB | Cnt-WrongLanA | Cnt-WrongLanB |
|---|---|---|---|---|
| MacAddress1 | 50 | 50 | 0 | 0 |
| MacAddress2 | 0 | 100 | 50 | 0 |
| ... | | | | |

Based on the information from the status table locally maintained, a D_agent constructs a statistics table (see Table 2), where:

1. ErrA=CntWrongLanA/CntReceivedA*100, if CntReceivedA is not 0; otherwise ErrA=0
2. ErrB=CntWrongLanB/CntReceivedB*100, if CntReceivedB is not 0; otherwise ErrB=0
3. StValA=0 if CntReceivedA=0; otherwise StValA=1
4. StValB=0 if CntReceivedB=0; otherwise StValB=1

TABLE 2

Statistics Table Attributes

| MacAddress | ErrA | ErrB | StValA | StValB |
|---|---|---|---|---|
| MacAddress1 | 0 | 0 | 1 | 1 |
| MacAddress2 | 0 | 50 | 0 | 1 |
| ... | | | | |

In the above ErrA, and ErrB can be given fixed values 50, and 100) based on the ratio of CntWrongLanB/CntReceivedB.

Thus, the D_agent generates information of the error rate for the traffic received each port (ErrA, ErrB), and an indicator of traffic received for each port (StValA, StValB).

A D_agent then sends the statistics table to the network manager and garbage collects all created tables. As an alternative, the D_agent can send the status table, i.e. the total number of received frames (CntReceivedA, CntReceivedB), and the number of received frames with wrong network tag (identifier) (CntWrongLanA, CntWrongLanB), and the network manager can obtain the statistics using the same.

The information for switches is gathered with S_agents. Switches are supposed to be connected to a single network (either LAN A or LAN B). Such switches (referred to as regular switches) cannot interpret the tagged traffic related to redundant networks as DANPs do. Such switches generally support Layer 2 sniffing protocols such as the Link Layer Discovery Protocol (LLDP).

An S_agent on a switch collects the LLDP information for every port. Namely, for every port, it collects the MAC address of the neighbor device, if such a device exists. The S_agent then checks if any of this neighboring MAC addresses belongs to other LAN switches by screening the network information available with it (information stored in memory, for example as a network configuration file uploaded during configuration). When detected information of such violations are sent in batches to the network manager, otherwise a message (e.g. ALL GOOD( )) indicating that there is no misconfiguration is sent.

The network manager waits until it hears back from all DANs and from all switches until a timeout expires. An expiring timeout, without having received a message from some nodes means that those nodes have most likely failed. Given its knowledge about the devices that exist in the network (e.g. provided during configuration) and the LAN they should belong to, the network manager, in one implementation, first checks for misconfigurations of switches. If any such misconfiguration is detected, the network manager suggests fixing the problem, without trying to check if any DAN misconfigurations exist. The mitigating action here can be the network manager directly commands one of the S_agents to disable the port connecting to the other switch or informs an operator (or network administrator) to perform this mitigation action.

In accordance with the implementation, if the network manager does not detect any misconfiguration between switches, then and only then does it move to check for the existence of DAN misconfigurations. A full network diagnosis can be said to be complete when the network manager declares that no misconfigurations are present at the level of switches and on the level of DANs.

The following describes how the network manager detects regular switch misconfigurations, and node misconfigurations:

Detecting Regular Switch Misconfigurations

As mentioned, the network manager would receive from each regular switch a message (information) indicating that there is no misconfiguration (an ALL GOOD( ) message), or an indication which switches (ports) are wrongly connected according to the comparison with the network information (e.g. comparison with configuration file). In accordance with the implementation, the network manager simply aggregates all violations received and notifies an operator about every pair of switch ports that are wrongly cabled. Remote solutions to mitigate the effect of the detected misconfigurations can be implemented based on the operator's request. For example, the network manager can initiate a communication for the affected switches for disabling the corresponding (concerned) ports.

Detecting PRP Nodes Misconfigurations

After identifying that no misconfigurations exist on the level of regular switches, in accordance with the implementation, the network manager proceeds to check for misconfigurations for DANs in PRP. The network manager has information on indicators and error rates that it can use to detect the misconfigurations. For example, the network manager has with information stored as a table or in a memory, which can be referred to for determining the misconfiguration. The information includes reference values for the indicators and error rates, and their relation to wrong cablings. Such information is stored beforehand based on analysis of different cabling issues that can be present at DANs.

To determine the misconfigurations, the network manager first examines the statistics gathered for each DAN and tries to identify missing cables. Missing cables can be detected if there is no traffic being received at a port (StValA or StValB being '0'). Afterwards it tries to detect and identify the existence of wrong cabling within the network.

To determine wrong cabling, the network manager can also compute values of indicators of ports being connected to the wrong network. A wrong cabling is determined for one or more ports (WrongA, WrongB) of one or more nodes based on the information received from each node. For example, the StValA, StValB, ErrA and ErrB for a device can be compared with reference values to see if the ports of the device are connected to the correct network, if they are receiving traffic of another network, if there are high number of frames with wrong network identifiers etc. The reference values are available (e.g. stored as a table or in memory of the device, which can be configured during engineering) for the indicators and error rates. As an example, ErrA can be one of '0', '50', '100', and StValA can be one of '0' and '1', and this can be defined beforehand. Therefore, WrongA, WrongB for port A and port B can be determined from ErrA, ErrB and StValA, StValB. For example, at a node:

WrongA=0, WrongB=1; if ErrA=0, ErrB=100, StValA=1, and StValB=1.

Here, WrongA=0 means that the port is connected to the correct LAN (i.e. LAN A), and 1 means that it is connected to the wrong LAN (i.e. LAN B). The threshold can be '0' or a minimal value to eliminate noise.

In an implementation, for every distinct pair of DANs, the network manager based on the obtained statistics from DANPs (ErrA, ErrB; and StValA, StValB), compares where they fit in the table shown in FIG. 6. This can include also calculating the WrongA and WrongB values based on the ErrA, ErrB and StValA and StValB. Thus, based on the actual values of the indicators and the error rates, and the reference values for them, which situation a device is in can be identified.

Thus, in accordance with the implementation, the network manager can compare the statistics (indicators, and error rates) to see if the pair of DNPs being investigated classify as belonging to any one of the nine (9) situations (refer last column of the table in FIG. 6). For each situation, the network manager draws the following conclusion and mitigations are recommended:

Situation 0 as shown in FIGS. 7A and 7B: Here, the network manager concludes that there are no misconfigurations and no misconfiguration alert is triggered.

Situations 4, 7, 8, and 9 as shown in FIGS. 7C, 7D and 7E: In this case, the network manager detects misconfigurations and a misconfiguration alert is triggered and the exact wrong cabling is identified. For instance, in situation 4, the network manager can identify that port B of DAN1 is wrongly cabled to LAN_A and hence can suggest an exact scheme to fix the misconfiguration. In that case (if desired by the operator), a network management protocol such as SNMP could remotely disable port B of DAN2 to disable traffic intercross between LANs until the cabling is corrected, without disrupting the system's operation.

Situation 5 as shown in FIG. 7F: In this case, the network manager detects misconfigurations and a misconfiguration alert is triggered and the network manager can notify the operator that both ports of DAN1 and DAN2 are connected to the same LAN (without being able to identify which LAN it is). If the operator wishes to know the exact LAN to which the devices are connected (not connected to), the network manager can run the same comparison between DAN1 and other existing DANs on the network. If the network manager finds another DAN that when paired with DAN1 fits either situation 4, 7, 8, or 9, then the exact LAN can be identified and reported. Otherwise the LAN cannot be identified. If the LAN is identified, this situation can be rectified remotely, if the operator desires, by shutting down wrongly connected port on both DANs.

Situation 6 as shown in FIG. 7G: In this case, the network manager detects misconfigurations and a misconfiguration alert is triggered and the network manager can notify the operator that both ports of DAN1 are connected to a single LAN and both ports of DAN2 are connected to the other LAN (without being able to identify which is connected to which LAN). If the operator wishes to know the exact LAN to which the devices are connected (not connected to), the network manager can run the same comparison between DAN1 and other existing DANs on the network. If it finds another DAN which when paired with DAN1 fits either situation 4, 7, 8, or 9, then the exact LAN can be identified and reported. Otherwise the LAN cannot be identified. If the LAN is identified, this situation can be partially rectified remotely, if the operator desires, by shutting down wrongly connected port on both DANs. However, this rectification does not restore communication between the concerned DANs as they are not part of the same single LAN=>hence human intervention is required for recovery.

Situation 3 as shown in FIG. 7H: In this case, the network manager detects misconfigurations and a misconfiguration alert is triggered and the network manager can notify the operator that either DAN1 or DAN2 has their ports inversely connected, i.e., port A to LAN B and port B to LAN A. However, it cannot yet identify which DAN suffers the misconfiguration. If the operator wishes to know which DANP of the two is misconfigured, the network manager can run the same comparison between DAN1 and other existing DANs on the network. If it finds another DAN which when paired with DAN1 fits situation 0, then the exact misconfigured DAN can be identified and reported. Rectifying this situation requires human intervention and cannot be done remotely since both ports of a DANP should be reconnected to the correct LANs.

Situations 1 and 2 (refer Table of FIG. 6): can be identified in a similar manner as situation 3.

When the system can distinguish which misconfiguration scenarios exist in the network, be it at the level of normal switches or at the level of PRP devices, then depending on the existing misconfiguration scenarios it might suggest automatic temporary fixes that prevent traffic intercrossing. The solutions would consist of temporarily disabling certain ports on devices (switches or PRP devices). Shutting down ports (disabling ports) can be carried via SNMP, which is supported in PRP drivers according to the PRP specification.

A check can be done for disabling the ports. Disabling ports should be carried only in cases when no network device is completely detached from both LANs after such disabling.

In case of HSR, the network manager detects wrong/ missing cables in HSR networks by simply examining the StVal values (StValA, StValB) of all devices.

In the wrong cabling example shown in FIG. 5 for instance, the network manager will detect that StValA of some Device 2 is equal to 0 for some duration (e.g. every 2 seconds). If that duration is equivalent to few HSR supervision periods (HSR sends supervision frames on a periodical basis), then the network manager concludes that port A of Device 2 is not connected.

Thus, the system of the present invention has agents running on devices that generate statistics (information) based on monitoring of frames or connections at the device and communicate the statistics to a network manager. At the network manager, the information received from the devices is analyzed to detect misconfigurations and suggest mitigations.

In the implementation describe above, it is mentioned that the network manager first detects and fixes switch misconfigurations and then proceeds to detect and mitigate DAN misconfigurations, where it first checks for missing cables and then checks for wrong cabling (i.e. port A connected to LAN B, both ports connected to LAN A etc.). Validating the interconnection between switches is required to avoid the statistics of the nodes being affected by their misconfigurations which can make the statistics less interpretive.

It is to be noted that the invention is not restricted to the above sequence (i.e. checking for switch misconfigurations first and then only checking for wrong cabling at nodes), and the misconfigurations may be detected in other ways. As an example, the information from DANs and switches can be processed in parallel.

The components of system as described hereinabove, performs the steps method individually or in combination for detecting and mitigating cabling issues.

Figure 8:
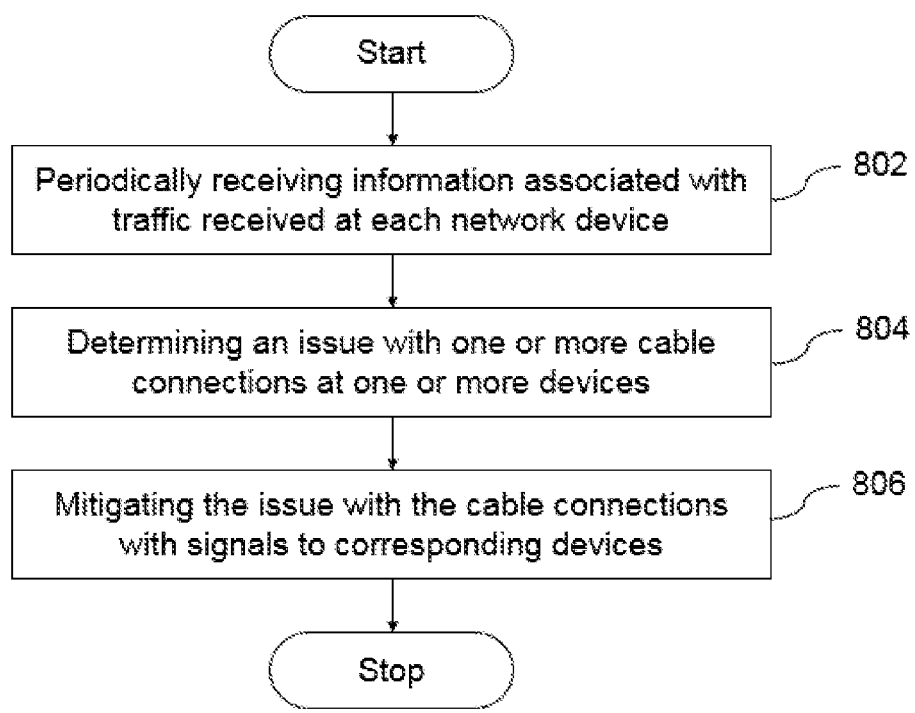
FIG. 8 is a flowchart of a method for detecting and mitigating the cabling issues, in accordance with an embodiment of the invention.

Reference is made to FIG. 8, which is a flowchart of the method for detecting and mitigating the cabling issues in accordance with an embodiment of the invention. This may be performed with the network manager based on the inputs from the agents.

At 802, the method includes receiving, at periodic instants of time, from each device information associated with traffic received at the corresponding device. For example, the network manager periodically receives the statistics from DANs and/or the switches. These statistics include the various indicators and error rates for a node (StValA, StValB; ErrA, ErrB), and include the status information or information of wrong neighbors for a switch.

At 804, the method includes determining an issue with one or more cable connections at one or more devices, based on the information received from each device. As described above, the network manager checks for switch misconfigurations and DAN misconfigurations to detect cable issues and suggest mitigative actions.

Accordingly, at 806, the method includes mitigating the issue determined with the one or more cable connections at the one or more devices. As described above, a switch misconfiguration is mitigated by sending a signal to shut down the corresponding ports of the switches that are detected as misconfigured. Further, a wrong cabling in case of DAN ports is mitigated by one of two options. In one option, where possible, a signal is sent to the node to shut down the ports of the node that are detected as misconfigured. In another option, a communication with a sequence of steps to be performed for mitigating the wrong cabling is sent. For example, a communication is sent to an operator device so that the operator can resolve the issue by following the sequence of steps. Such sequence is dependent on the cabling issue and can be provided as per the detected issue.

Here; as described above, in one implementation, switch misconfigurations are detected and mitigated prior to detecting and mitigating wrong cabling at nodes. Accordingly, here, determining the issue with the cable connections includes sequentially performing:

determining switch misconfigurations,
mitigating the switch misconfiguration;
determining wrong cabling for nodes; and
mitigating the wrong cabling for the corresponding ports of the nodes.

Thus, the method includes receiving periodically receiving information from different devices connected in the redundant communication networks. The information is analyzed to determine if any switch or node is having misconfiguration, and depending on the misconfiguration, corresponding mitigation actions can be performed with communication to the corresponding devices.

Accordingly, by deploying a distributed method that exploits the knowledge exchange between all node pairs and thereby identifies potential wrong cabling among networking devices (e.g., switches) the invention increases the accuracy of identifying wrong cabling scenarios allowing to have a more accurate view of the network state. Additionally, the invention mitigates the undesirable effects (whenever feasible) of wrong cabling in an automated manner.

We claim:

1. A method for detecting and mitigating cabling issues with devices connected in redundant communication networks of a substation automation system, wherein each device is a node or a switch, the method comprising:
  receiving, at periodic instants of time, from each device information associated with traffic received at the corresponding device,
    wherein the information received from a node comprises an indicator of traffic received for each port, and an error rate for the traffic received at each port, and wherein the indicators and the error rates are determined from total number of frames received at each port and total number of frames received with wrong network identifiers at each port, and
    wherein the information received from a switch comprises at least one of a status information and a misconfiguration information, determined from one or more device identifiers collected for each port of the switch;

determining an issue with one or more cable connections at one or more devices, based on the information received from each device,
  wherein a switch misconfiguration is determined if the information received from at least one switch includes the misconfiguration information, and
  wherein a wrong cabling is determined for one or more ports of one or more nodes based on a comparison of the information received from each node with reference values; and
mitigating the issue determined with the one or more cable connections at the one or more devices,
  wherein the switch misconfiguration determined for the at least one switch is mitigated by sending a signal to shut down the corresponding ports of the at least one switch that are detected as misconfigured, and
  wherein the wrong cabling determined for the one or more ports of the one or more nodes is mitigated by one of:
  sending a signal to shut down the corresponding ports of the at least one node that are detected as misconfigured, and
  sending a communication with a sequence of steps to be performed for mitigating the wrong cabling.

2. The method of claim 1, wherein determining the issue with the one or more cable connections comprises sequentially performing:
  determining the switch misconfiguration for the at least one switch;
  mitigating the switch misconfiguration for the at least one switch;
  determining the wrong cabling for the one or more ports of the one or more nodes; and
  mitigating the wrong cabling for the one or more ports of the one or more nodes.

3. The method of claim 1, wherein at least one of the status information and the misconfiguration information for the switch is determined by collecting Link Layer Discovery Protocol (LLDP) information for each port of the switch, wherein the LLDP information comprises unique identifiers of one or more devices connected with the switch, and wherein the LLDP information is compared with network information available with the switch to determine at least one of the status information and the misconfiguration information.

4. The method of claim 1, wherein determining the wrong cabling for the one or more ports of the one or more nodes comprises comparing the information received from each node of two paired nodes with the reference values to determine at least one of:
  one port of one node amongst the paired nodes having the wrong cabling;
  two ports of one node amongst the paired nodes having the wrong cabling;
  one port of both the paired nodes having the wrong cabling; and
  both the ports of both the paired nodes having the wrong cabling.

5. The method of claim 1, wherein the redundant communication networks support at least one of Parallel Redundancy Protocol (PRP) and High-availability Seamless Redundancy (HSR).

6. The method of claim 1, wherein the method is performed with an industrial device configured to receive the information from each device connected in the redundant communication networks.

7. A system for detecting and mitigating cabling issues with devices connected in redundant communication networks of a substation automation system, wherein each device is one of a node or a switch, the system comprising:
  an agent running on each device, configured to periodically generate and transmit information associated with traffic at the corresponding device,
  wherein the agent on a node is configured to generate information of an indicator of traffic received for each port, and an error rate for the traffic received at each port, and wherein the agent generates the information from monitoring of frames at the node to determine at periodic instants total number of frames received at each port and total number of frames received with wrong network identifiers at each port, and
  wherein the agent on a switch is configured to generate information of at least one of a status information and a misconfiguration information, from monitoring of one or more device identifiers collected at periodic instants for each port of the switch; and
  an industrial device executing a network manager, the network manager configured to:
  receive the information transmitted by each agent running on each device connected in the redundant communication networks;
  determine an issue with one or more cable connections at one or more devices, based on the information received from each device, wherein a switch misconfiguration is determined if the information received from at least one switch includes the misconfiguration information, and wherein a wrong cabling is determined for one or more ports of one or more nodes based on comparison of the information received from each node with reference values; and
  mitigate the issue determined with the one or more cable connections at the one or more devices, wherein the switch misconfiguration determined for at least one switch is mitigated by sending a signal to shut down the corresponding ports of the at least one switch that are detected as misconfigured, and wherein the wrong cabling determined for the one or more ports of the one or more nodes is mitigated by one of sending a signal to shut down the corresponding ports of the at least one node that are detected as misconfigured, and sending a communication with a sequence of steps to be performed for mitigating the wrong cabling.

* * * * *